Patented Sept. 6, 1949

2,480,928

UNITED STATES PATENT OFFICE 2,480,928

CONTROLLING POLYMERIZATION OF POLY-HYDRIC ALCOHOL ESTERS OF ALPHA-OLEFINIC DICARBOXYLIC ACIDS WITH ETHYLENIC MONOMERS

Everett C. Hurdis, Passaic, N. J., assignor to United States Rubber Company, New York, N. Y., a corporation of New Jersey No Drawing. Application December 30, 1944, Serial No. 570,765

9 Claims. (Cl. 260—45.4)

1

This invention relates to improvements in the manufacture of products, and fabricated articles, from certain resins of the general class known as non-by-product-forming polymerizable resins. These resins are formed of liquid or semi-liquid polymerizable components which polymerize together, or interpolymerize, in what is known as the oil phase, without splitting off by-products, e. g., water, to form, eventually, hard resins. Usually, this reaction is expedited by the use of an oxygen-containing polymerization catalyst such as benzoyl peroxide, peroxides of aliphatic acids, ascaridole, and other organic peroxides, but even so temperatures of 50° C. to 125° C. are usually required for rapid gelation and polymerization.

It is the purpose of this invention to provide a practical means for greatly accelerating at temperatures below 50° C. the interpolymerization of unsaturated alkyd resins with monoenic compounds having a single terminal ethylenic group $CH_2=C<$. It is, as stated, customary to carry out such polymerizations at temperatures between 50° C. and 125° C., using as catalysts such oxygen-containing compounds as benzoyl peroxide, peroxides of aliphatic acids, ascaridole, and other organic peroxides. The speed with which these known systems polymerize can be regulated within certain limits by regulating the amount of catalyst added and the temperature at which polymerization is carried out. It is possible by such means to prepare systems which will polymerize in a few minutes at the higher temperature, i. e., about 125° C., or in a few hours at the lower temperature, i. e., about 50° C. It is also customary to add polymerization inhibitors such as benzaldehyde, paratertiary-butylcatechol, hydroquinone, tetrachloroquinone, and phenyl-$\beta$-naphthylamine to the liquid polymerizable systems to prevent premature polymerization during storage. This desired storage stability is of necessity accompanied by a decrease in the overall rate at which polymerization takes place in the presence of the usual catalysts such as benzoyl peroxide. Thus, with such stabilized polymerizable systems, it becomes necessary to use more catalyst to obtain a given rate of polymerization than would be necessary with an uninhibited polymerizable system.

Although it is of course possible to accelerate the polymerization of certain systems containing no added inhibitor so that they will polymerize at temperatures below 50° C. in periods of time ranging from a few hours to several days, such an increase in polymerization speed means the

2 sacrifice of the storage stability of the uncatalyzed polymerizable system. Such uninhibited systems often tend to polymerize spontaneously on standing and to become unstable. Hence, this method of increasing the rate of polymerization at temperatures below 50° C. is impractical.

An object of the invention is to provide certain chemical means (called herein promoters) adjunctive to said oxygen-containing catalyst, for promoting the gelation and thereby increasing the overall rate of polymerization at temperatures below 50° C., and thereby giving to the liquid resinous mix cold-setting and cold-curing properties. It will be at once apparent that this permits new and improved fabricating techniques and speeding up of production. Of particular adaptability to this technique is the class of resins produced from polymerizable mixtures of unsaturated alkyd resins with monoenic compounds, to which belong the resins represented by the polyethylene glycol maleate-styrene copolymer resins covered by the Ellis U. S. Patents Nos. 2,255,313 and 2,195,362 and the American Cyanamid Co. British Patents Nos. 540,167 and 540,168. These resins harden to form tough, noncracking surfaces.

I have found that by using in conjunction with a conventional catalyst, such as benzoyl peroxide, a small amount of a tertiary monoamine which contains attached to the nitrogen atom two functionally aliphatic radicals and one aromatic radical and which is devoid of nitro and nitroso groups, I can greatly increase the overall rate of polymerization at temperatures below 50° C. of polymerizable mixtures of unsaturated alkyd resins with monoenic compounds having a single terminal ethylenic group $CH_2=C<$. Nitro and nitroso groups must be avoided since their presence has been found to inhibit polymerization at temperatures below 50° C. For example, while N-dimethylaniline greatly increases the rate of polymerization of these systems, p-nitrodimethylaniline or p-nitrosodimethylaniline completely inhibits the polymerization. This inhibiting action appears to be a specific property of the nitro and nitroso groups and is not a general property of negative groups. Among negative groups which are known not to destroy the promoting activity of monoaryl-dialkyl tertiary monoamines are the aldehyde group (—CHO), the phenolic hydroxyl group (—OH), and the azo group (—N=N—).

The responsiveness to the present invention of the herein described polymerizable mixtures of unsaturated alkyl resins with monoenic compounds having a single terminal ethylenic group $CH_2=C<$, seems to reside in their property of being capable of polymerizing relatively rapidly in the presence of peroxide catalyst and in the absence of any added promoter, compared with other members of the general class of non-by-product-forming polymerizable resins.

Small amounts of the monoaryl dialkyl tertiary monoamines of the invention are effective in increasing the overall speed of polymerization of such polymerizable mixtures containing polymerization inhibitors at temperatures below 50° C. to such an extent that such systems may be polymerized in a few minutes. This rapid rate of polymerization is gained without any accompanying sacrifice of the storage stability of the polymerizable systems. Rapid polymerizations at low temperatures are thus made completely practical.

Polymerizable systems of the type to which my invention is applicable are commonly used in the fabrication of laminated articles composed of absorptive or porous sheet materials such as paper, cloth, or fibrous glass impregnated with and bonded with the solid polymer. In preparing these articles it is customary to impregnate or coat the porous sheet material with the liquid polymerizable mixture which has been prepared by known methods so that it has the proper viscosity at the temperatures employed during application—usually about 25° C. or slightly higher. The impregnated sheet materials may then be plied together and formed to the desired shape. Heat is then applied to raise the temperature of the polymerizable mixture to a point where the polymerization will take place at a rapid enough rate. This temperature is usually well above 50° C. and usually in the neighborhood of 125° C. While it is necessary to raise the temperature to speed up the polymerization of the mixture, this increase in temperature brings about an undesirable decrease in the viscosity of the liquid mixture, with the result that the liquid tends to flow away from spaces between the layers of fabric and paper, leaving so-called "starved spots" or areas where there will be insufficient polymer in the finished articles. This is also true with vertical areas. Difficulty has been encountered in forming smooth surfaces on flat sheets with such resins.

On the other hand, by using a polymerizable mixture containing a catalyst and a sufficient amount of a designated tertiary monoamine which contains attached to the nitrogen atom two functionally aliphatic radicals and one aromatic radical to cause rapid polymerization at temperatures below about 50° C., it is not necessary to raise the temperature above 50° C. in order to cause the mixture to set to a non-flowable state. Low viscosity effects are thus avoided. It is thus possible to allow the mixture to set or gel at room temperature or slightly above and then, if desired, to complete the polymerization at an elevated temperature without causing unequal distribution of the resin (formation of starved areas) since no decrease in viscosity will take place.

Although the principles of my invention are particularly useful in the production of laminated articles they can also be satisfactorily applied to the production of castings or coatings wherever it is desired to have rapid polymerization at low temperatures.

The polymerization of the systems involved in this invention takes place in several recognizable stages. The resin mixture remains quite fluid with little or no change in viscosity during a period of time called the "induction" period. After this the viscosity increases very rapidly until the mixture becomes a soft solid. The time necessary to reach this stage is called the gel time. The material, if undisturbed, continues to increase in hardness gradually until a hard solid stage is reached.

In carrying out polymerizations in the oil phase according to this invention, several procedures may be followed. It is preferred to dissolve the peroxide catalyst in the less viscous of the resin components, which is then mixed with the other resin component. The promoter may then be incorporated directly in the mixture, which is then ready for use in casting or for producing such articles as are desired. (It has not been found practical to add the promoter to either of the resin components at a time long before use since the activity of the promoter is gradually destroyed on standing.)

If a casting is to be made, the mixture is poured into a previously prepared form and allowed to stand at temperatures ranging from 0° to 50° C. until the resin has polymerized at least to the gel point. If the resin is to be used for impregnating or coatings, it is applied to the desired base material which may either be shaped immediately and the gel allowed to form in the position desired, or the gel may be allowed to form in a horizontal position after which the article can be molded and the rest of the polymerization carried out at a higher temperature.

The base materials subject to impregnating or coating may be in sheet, filament, or other form, and comprise materials of metal, vegetable, animal, mineral, or synthetic nature.

The monoenic compounds used in the invention are those which are capable of addition polymerization and contain one and only one terminal $CH_2$ group doubly bonded to a carbon atom which in turn is bonded to at least one negative radical. Specific examples of such compounds are: styrene, in which the negative group is the phenyl radical; vinyl chloride, in which it is the chloride radical; vinyl acetate, in which it is the acetoxy radical; esters of acrylic and methacrylic acids, in which it is a carbo-ester radical; acrylonitrile and methacrylonitrile, in which it is the carbonitrile radical.

The unsaturated alkyds used in the invention are prepared in known manner by the reaction of polyhydric alcohols with unsaturated dicarboxylic acids or their anhydrides (the use of the anhydride being equivalent to the use of the acid), with or without the presence of modifying agents, such as monohydric alcohols, saturated monocarboxylic acids, saturated polycarboxylic acids, drying or semi-drying oils, etc. Unsaturated alkyds of this type are described, for example, in U. S. Patents Nos. 2,195,362 and 2,255,313. The proportions in which the interpolymerizable components are mixed may be varied widely; e. g., the amount of the polyenic alkyd resin may range from about 20% to about 95% of the mixture of interpolymerizable components. The unsaturated organic acids which I prefer in preparing the alkyds used in the invention are maleic, fumaric, citraconic, itaconic, mesaconic, aconitic, chloromaleic, and carbic acids. The polyhydric alcohols preferred for use in the invention are ethylene glycol, diethylene glycol, triethylene glycol, other polyethylene glycols, propylene glycol, 2,2-dimethylpropanediol-1,3, glycerol, pentaerythritol, 1,3-butanediol, polymethylene glycols (e. g., trimethylene glycol), and 2-butyl-2-ethyl-butanediol-1,3.

The following are examples of suitable tertiary monoamines which contain attached to the nitrogen atom two functionally aliphatic radicals and one aromatic radical within the scope of the invention: dimethylaniline, diethylaniline, di-n propylaniline, methylbenzylaniline, dimethyl-p-toluidine, diethyl-p-toluidine, dimethyl-o-toluidine, dimethyl-α-naphthylamine, diethyl-α-naphthylamine, p-dimethylaminoazobenzene, N,N-dimethyl-m-aminophenol, p-hydroxy-N,N-di(β-hydroxyethyl) aniline, p-dimethylaminophenyl oxalate, p-dimethylaminophenyl acetate, and p-dimethylaminobenzaldehyde.

The amount of promoter may be varied, depending on the specific character of the polymerizable resin, the specific catalyst, and the specific inhibitor. For any given system of inhibited polymerizable mixture, it will be found that as the amount of added tertiary monoamine which contains attached to the nitrogen atom two functionally aliphatic radicals and one aromatic radical is increased, the gelling time is progressively reduced. Generally, a usable range for the promoter ranges from 0.005 to 5.0 parts per 100 parts by weight of the polymerizable mixture.

The following examples are given further to illustrate the invention, the parts being by weight:

EXAMPLE I

A reactive alkyd is prepared by reacting 1.05 mols of diethylene glycol with 1.00 mol of maleic anhydride at 170° C. in a carbon dioxide atmosphere until an acid number of 50 is attained. Two parts of benzoyl peroxide are dissolved in 30 parts of monomeric styrene containing 0.010 part of p-tertiary-butyl-catechol (inhibitor). Seventy parts of the alkyd are then dissolved in the styrene solution by stirring. As soon as this mixture is homogeneous, 0.2 part of diethylaniline is added and the mixture stirred for one minute. In Table I are noted the comparative times in which gelation occurs for the above mixture, for a mixture to which benzoyl peroxide but no monoaryl-dialkyl tertiary amine is added, and for a mixture to which neither amine nor catalyst has been added.

TABLE I

|  | (1) | (2) | (3) |
|---|---|---|---|
| Alkyd | 70 | 70 | 70. |
| Styrene monomer | 30 | 30 | 30. |
| p-Tertiary-butyl-catechol | 0.01 | 0.01 | 0.01. |
| Benzoyl peroxide | 2.0 | 2.0 | None. |
| Diethylaniline | 0.2 | None | Do. |
| Gelling time at 25° C | 9 min. | 50 hrs. | Several months. |

This example illustrates clearly the tremendous effect obtained by the use of the combination of monoaryl-dialkyl tertiary amine with the peroxide catalyst in the inhibited resin combination.

EXAMPLE II

Table II lists the gelling times which were observed with numerous tertiary monoamines which contain attached to the nitrogen atom two functionally aliphatic radicals and one aromatic radical promoters used in accordance with the invention. The amount of promoter indicated in the table was added to the resin combination consisting of 70 parts of a reactive alkyd produced by the method of Example I, 30 parts of monomeric styrene, 0.01 part of p-tertiary-butyl-catechol and 1 part of benzoyl peroxide in the manner described above.

It may be seen from this table that small amounts of any of a large number of monoaryl-dialkyl tertiary monoamines produce a tremendous effect when used in conjunction with benzoyl peroxide catalyst.

TABLE II

| Promoter | Concentration (Parts per 100 Resin) | Gel Time (minutes at 25° C.) |
|---|---|---|
| None | | 3,000 |
| Dimethylaniline | 0.05 | 20 |
| Dimethyl-p-toluidine | 2.0 | 1 |
| Do | 0.2 | 1 |
| Do | 0.02 | 6 |
| Diethyl-p-toluidine | 2.0 | 1 |
| Do | 0.2 | 21 |
| Do | 0.02 | 124 |
| Diethylaniline | 5.0 | 1 |
| Do | 1.0 | 4 |
| Do | 0.05 | 120 |
| Di-n-propylaniline | 2.0 | 2 |
| Do | 0.2 | 12 |
| Do | 0.02 | 74 |
| Methyl-benzylaniline | 2.0 | 5 |
| Do | 0.2 | 20 |
| Do | 0.02 | 63 |
| Dibenzylaniline | 2.0 | 30 |
| Do | 0.2 | 186 |
| Dimethyl-o-toluidine | 2.0 | 5 |
| Do | 0.2 | 98 |
| Dimethyl-α-naphthylamine | 2.0 | 6 |
| Do | 0.2 | 6 |
| Diethyl-α-naphthylamine | 2.0 | 7 |
| p-Dimethylaminoazobenzene | 2.0 | 10 |
| N,N-Dimethyl-m-aminophenol | 0.2 | 57 |
| Do | 0.02 | 82 |
| p-Hydroxy-N,N-di-β-hydroxy-ethyl-aniline | 0.2 | 199 |
| p-Dimethylaminophenyl oxalate | 2.0 | 75 |
| Do | 0.2 | 180 |
| p-Dimethylaminophenyl acetate | 2.0 | 5 |
| Do | 0.2 | 10 |
| Do | 0.02 | 30 |
| p-Dimethylaminobenzaldehyde | 2.0 | 25 |
| Do | 0.2 | 70 |

EXAMPLE III

The results of further examples of this invention are recorded in Table III. One hundredth part of each of the inhibitors listed is added to 30 parts of monomeric styrene. Each solution is then compounded with 70 parts of a reactive alkyd made as in Example I, and two parts of benzoyl peroxide and 0.1 part of diethylaniline are added. The results show the tremendous effect of the promoter in the presence of a variety of inhibitors.

TABLE III

| Inhibitor (0.01 part) | Gel Time (Minutes) at 25° C. | |
|---|---|---|
| | With Promoter | Without Promoter |
| p-tertiary-butyl-catechol | 36 | 900 |
| hydroquinone | 5 | 720 |
| tetrachloroquinone | 6 | 720 |
| p-nitrosodimethylaniline | 25 | 180 |
| phenyl-β-naphthylamine | 3 | 135 |
| benzaldehyde | 2 | 52 |
| no inhibitor | 2 | 42 |

EXAMPLE IV

Examples of different monoenic monomers which can be used with the non-conjugated polyolefinic reactive alkyd according to the invention are recorded in Table IV. Thirty parts or each monomer are mixed with 70 parts of the reactive alkyd, and 2 parts of benzoyl peroxide and 0.10 part of diethylaniline are added. The table lists the gel times of the mixtures and shows that the polymerization of all these mixtures is effected rapidly by means of the combination of the monoaryl-dialkyl tertiary amine and the peroxide.

TABLE IV

| 30 Parts Monomer | Gel Time at 25° C. | |
|---|---|---|
| | With promoter, 0.10 part Diethylaniline | Without promoter |
| | Minutes | Minutes |
| Methyl acrylate | 7 | 1,140 |
| Cyclohexyl acrylate | 6 | 720 |
| Methyl methacrylate | 13 | 4,020 |
| Vinyl acetate | 8 | 1,020 |
| Acrylonitrile | 31 | 3,300 |
| Styrene | 2 | 42 |

EXAMPLE V

Table V illustrates the use of different peroxides as catalysts in the system of resins used in this invention. Two parts of the catalyst are dissolved in 30 parts of styrene containing 0.001 part of p-tertiary butylcatechol as an inhibitor. This solution is then added to 70 parts of a reactive alkyd as described in Example I. To different portions of this combination are added respectively, 0.1% and 0.4% of diethylaniline, and the gel times are determined for the promoted resins and for the resin containing no promoter. It is apparent from the results that the different peroxides are effective in this system.

TABLE V

*Activity of different peroxides in the presence of promoter*

| | Gel Times at 25° C. Diethylaniline Added | | |
|---|---|---|---|
| | 0.1 part | 0.4 part | None |
| | Minutes | Minutes | Minutes |
| Benzoyl peroxide | 1 | 1 | 720 |
| Lauroyl peroxide | 62 | 20 | 720 |
| Ascaridole | 90 | 503 | 1,280 |
| t-Butyl-hydroperoxide | 2,880 | 2,880 | 8,000 |

Although I have shown and described various embodiments of the invention it is to be understood that the invention is susceptible to those modifications which appear within the spirit of the invention and the scope of the claims.

Having thus described my invention, what I claim and desire to protect by Letters Patent is:

1. A polymerizable mixture of an unsaturated alkyd resin derived from an alpha-olefinic dicarboxylic acid and a polyhydric alcohol and a monomeric unsaturated polymerizable compound having a single terminal ethylenic group $CH_2=C<$ which is attached to a negative radical, capable of interpolymerization at temperatures below 50° C., containing a peroxidic polymerization catalyst and a polymerization inhibitor, and in addition a promoter of gelation which is a N,N-dialkyl aryl tertiary monoamine in which the alkyl and aryl groups are hydrocarbon groups, said amine being devoid of nitro and nitroso groups, said promoter being in a proportion ranging from 0.005 to 5 parts per 100 parts by weight of the polymerizable mix.

2. In a method of controlling the oil phase gelling and polymerization of a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding a small but effective amount of a promoter of gelation which is a tertiary monoamine containing attached to the nitrogen atom two functionally aliphatic radicals selected from the group consisting of alkyl hydrocarbons, hydroxy-substituted alkyl hydrocarbons, and aralkyl hydrocarbons and one aromatic radical selected from the group consisting of aryl hydrocarbons, azo-substituted aryl hydrocarbons, amino-substituted aryl hydrocarbons, hydroxy-substituted aryl hydrocarbons, and aldehyde-substituted aryl hydrocarbons, and salts thereof, said monoamine being devoid of nitro and nitroso groups.

3. In a method of controlling the oil phase gelling and polymerization of a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding a small but effective amount of a promoter of gelation which is an N,N-dialkyl aryl tertiary monoamine in which the alkyl and aryl groups are hydrocarbon groups, said monoamine being devoid of nitro and nitroso groups.

4. In a method of controlling the oil phase gelling and polymerization of a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding a small but effective amount of dimethylaniline as a gelation promotor.

5. In a method of controlling the oil phase gelling and polymerization of polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding a small but effective amount of dimethyl-p-toluidine as a gelation promoter.

6. In a method of controlling the oil phase gelling and polymerization of a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding a small but effective amount of diethyl-p-toluidine as a gelation promoter.

7. A polymerizable mixture comprising a reactive unsaturated alkyd resin derived from an ethylene-alpha, beta-dicarboxylic acid and a glycol, together with a liquid monomeric unsaturated polymerizable compound in which the unsaturation is due to a single terminal ethylenic linkage $CH_2=C<$ which is attached to a negative radical, and in which liquid compound said alkyd is soluble and with which it is copolymerizable in the presence of a peroxidic polymerization catalyst, a peroxidic polymerization catalyst, and a small but effective amount of a promoter of gelation which is a tertiary monoamine containing attached to the nitrogen atom two functionally aliphatic radicals selected from the group consisting of alkyl hydrocarbons, hydroxy-substituted alkyl hydrocarbons, and aralkyl hydrocarbons and one aromatic radical selected from the group consisting of aryl hydrocarbons, azo-substituted aryl hydrocarbons, amino-substituted aryl hydrocarbons, hydroxy-substituted aryl hydrocarbons, and aldehyde-substituted aryl hydrocarbons, and salts thereof, said monoamine being devoid of nitro and nitroso groups.

8. A polymerizable mixture comprising a liquid reactive unsaturated glycol ester of an ethylene-alpha, beta-dicarboxylic acid, and a liquid monomeric unsaturated polymerizable compound in which the unsaturation is due to a single terminal ethylenic group which is attached to a negative radical, and in which the said liquid ester is soluble and with which ester it is copolymerizable in the presence of a peroxy polymerization catalyst, and in which the said ester ranges from 20-95% of the mixture of interpolymerizable components, a peroxidic polymerization catalyst, and a small but effective amount of a promoter of gelation which is a tertiary monoamine containing attached to the nitrogen atom two functionally aliphatic radicals selected from the group consisting of alkyl hydrocarbons, hydroxy-substituted alkyl hydrocarbons, and aralkyl hydrocarbons and one aromatic radical selected from the group consisting of aryl hydrocarbons, azo-substituted aryl hydrocarbons, amino-substituted aryl hydrocarbons, hydroxy-substituted aryl hydrocarbons, and aldehyde-substituted aryl hydrocarbons, and salts thereof, said monoamine being devoid of nitro and nitroso groups.

9. In a method of controlling the oil phase gelling and polymerization of a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding a small but effective amount of a promoter of gelation which is an N,N-dialkyl aryl tertiary monoamine in which the alkyl and aryl groups are hydrocarbon groups.

EVERETT C. HURDIS.

No references cited.